Patented Aug. 7, 1928.

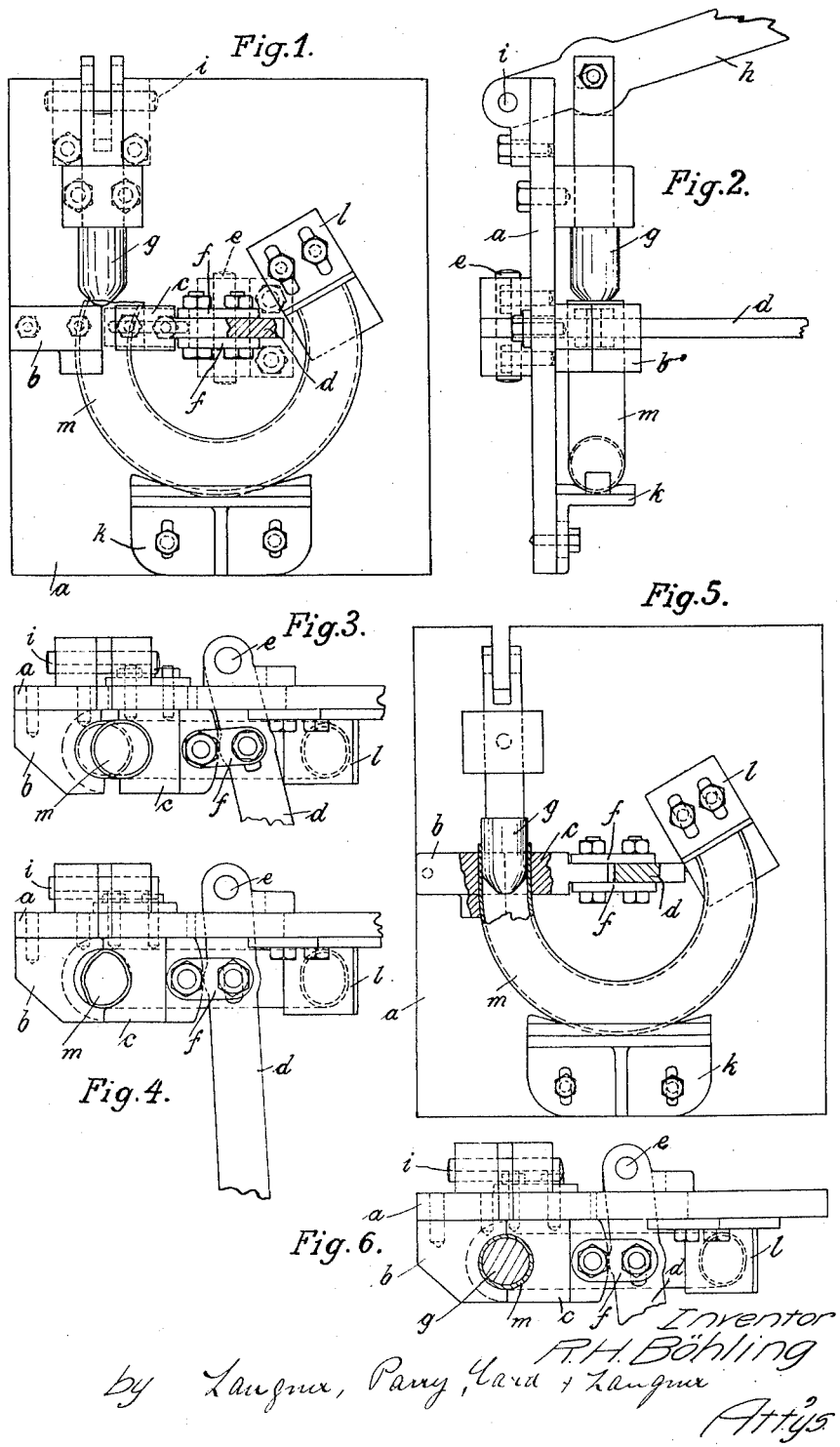

1,680,008

UNITED STATES PATENT OFFICE.

RUDOLF HIERONYMUS BÖHLING, OF HAMBURG, GERMANY, ASSIGNOR TO THE FIRM OF ROHRBOGENWERK GESELLSCHAFT MIT BESCHRANKTER HAFTUNG, OF HAMBURG, GERMANY.

APPARATUS FOR STRAIGHTENING THE ENDS OF BENT PIPES.

Application filed October 1, 1925, Serial No. 59,896, and in Germany November 28, 1924.

In bent pipes (elbows, bends or the like), which are produced from straight pipes, the curve or bending goes up to the very ends. The same is the case when from longer bent pipes, for instance from such, which span about three-quarters or half of a circle, smaller arcs of bent pipes (for instance in the length of one quarter of a circle) are cut off, or when larger arcs of bent pipes are cut into a number of smaller arcs of bent pipes. The ends of such bends therefore are never cylindrical, and the deviation from the cylindrical shape is the greater the smaller the radius of the bend is.

The non-cylindrical shape of the ends of bent pipes makes it difficult to apply flanges or sockets, muffs, nipples or couplings or the like with an absolutely central fit. With bends having a small radius of curvature the bore of the muff or coupling or of the flange must be slightly larger than the outer diameter of the bend or elbow, to allow the curved end of the latter to enter the flange or coupling or the like. To avoid this the bore in the flange or coupling must be hollowed out correspondingly to secure a good fit.

The straightening of the ends of the bends is difficult because in the production of the bends by rolling, drawing or the like the material becomes hard. If the straightening of the bend is carried out by hammering or pressing an inconvenient increase of the diameter would result.

The present invention provides an apparatus by which the ends of the bends are straightened in a new improved manner, securing an exact cylindrical shape while retaining the original diameter. The device operates in this way that an end of the bend is first worked upon between two jaws, which close upon one another and which are preferably semi-circular. By these means that half of the bend which faces the center of curvature is pressed outwardly, that is to say in such direction that it is urged into the space of the contemplated cylinder of the pipe end. When the two semi-circular jaws close upon one another they form a mould, which is so dimensioned and situated, that the cylindrical inside face corresponds exactly to the outer face of the cylindrical pipe end aimed at. By this closing up of the jaws and thus pressing the inner part of the pipe end outwardly the cross-section of the latter will be changed. At a certain distance from the closed jaws a cylindrical mandrel is suitably guided in the axis of the jaws, the diameter of which mandrel corresponding exactly to the inner diameter of the pipe. By driving this mandrel into the deformed end of the bend the latter will be given a cylindrical shape, the outer face of the mandrel and the inner face of the jaws forming a cylindrical annular space. Within this space the end of the pipe will be submitted to a progressive pressure inside out by the mandrel continuing to force its way forwardly, and this has such a squeezing effect that finally the end of the bend is given an exact cylindrical shape.

An apparatus for carrying the invention into effect is shown in the drawings by way of example.

Fig. 1 is the front view of the apparatus into which a bend is placed, the apparatus being shown in a position in which the straightening operation commences.

Fig. 2 is a side view, and

Fig. 3 a plan of the apparatus in the position shown in Fig. 1.

Fig. 4 is a plan of the apparatus the jaws being closed upon one another.

Fig. 5 is a front view in a position in which the mandrel has entered the pipe, and Fig. 6 is a plan of the apparatus in the position shown in Fig. 5.

On the base or foundation plate $a$ a semicircular jaw $b$ is firmly mounted, and opposite the latter a second semi-circular jaw $c$ is arranged movably in such manner, that when it closes upon the first named jaw both form a hollow space open on top and bottom, the diameter of which corresponds to the outer diameter of the bend to be straightened at its end. The movable or slidable jaw $c$ is operated by a lever $d$, which is fulcrumed on the foundation plate $a$ to a bolt $e$, and which is connected with the jaw $c$ by links $f$. In the axis of the hollow of the closed jaws $b$ and $c$ a cylindrical mandrel $g$, which is somewhat conically shaped at its lower end, is arranged, suitably guided and pivotally connected to a lever $h$ fulcrumed to a fixed pin or stud $i$ on the base plate $a$. By the aid of this lever the mandrel $g$ can be operated to enter the hollow space of the jaws $c$ and $b$ and be again withdrawn therefrom to such an extent that its lower conical end stops at a short distance above the jaws c, b.

An adjustable bracket k is mounted on the base plate a near its lower end, and an adjustable block or stop l laterally to the jaw c.

The bend m, the end of which is to be straightened, will be placed on the apparatus in such manner, that one of the ends projecting between the jaws c and b and the bend itself rests on the bracket k. Thereupon the stop l is so adjusted and fastened, that it forms a foothold for the other end of the bend m. By the aid of the hand lever d the jaw c is firmly pressed against the jaw b, and is then locked in this position by any suitable means not shown. That part of the bent end contacting with the jaw c is pressed in a direction towards the jaw b, while that part of the bent end which contacts with the jaw b is only to a slight extent pressed outwardly. By this operation the end of the bend has lost its proper shape, as may be seen from Fig. 4. Thereupon by the aid of the lever h the cylindrical mandrel g is pressed into the end of the bend. It follows that not only the proper cross-section shape is restored but the end is also pressed into cylindrical shape, that is the end is straightened out, since the end of the bend is submitted to a pressure by the mandrel on its inside and at the same time by the cylindrical jaws b and c on the outer side.

When the mandrel g is withdrawn and the jaw c moved back the bend can be taken out and turned over, so as to allow of an operation on the other end in the same manner.

It might go without saying that the mandrel g and the jaws b and c must be dimensioned to the proper diameter of the bend to be straightened, that is to say they must be arranged interchangeably, so as to enable them to be replaced by other mandrels and jaws of smaller or larger diameter.

For moving the jaw c any suitable means may be provided, the hand lever d is only shown as an example. If a known screw spindle is used no special means for locking the jaw need be provided.

I claim:

1. An apparatus for straightening out the ends of bent pipes comprising jaws adapted to move towards one another and forming a hollow cylindrical space when closed, the diameter of which corresponds to the outer diameter of the pipe, a reciprocating mandrel, the length of the pipe engaging portion of which is substantially that of an element of the cylindrical space formed by said jaws and its diameter corresponding to that of the inner diameter of the pipe, an adjustable bracket for supporting a bent pipe at an intermediate portion, an adjustable stop against which the free end of the bent pipe rests to hold the pipe in proper position, means to press the said mandrel into the end placed in between the jaws and means to close the jaws upon said pipe.

2. Apparatus for reforming the ends of bent pipe comprising cooperative jaws adapted compressively to embrace the pipe end to be reformed, a reciprocating mandrel fitting the normal bore of the pipe end, adapted to be forcibly moved in a path intersecting the zone embraced by said jaws, and adjustable supporting members arranged to engage respectively an intermediate part and the opposite end of said pipe.

3. Apparatus for reforming the ends of bent pipe comprising cooperative jaws adapted compressively to embrace the pipe end to be reformed, a reciprocating mandrel fitting the normal bore of the pipe end, adapted to be forcibly moved in a path intersecting the zone embraced by said jaws, adjustable supporting members arranged to engage respectively an intermediate part and the opposite end of said pipe, and a base upon which said jaws, mandrel, and supporting members are supported.

In testimony whereof I have signed my name to this specification.

RUDOLF HIERONYMUS BÖHLING.